June 2, 1970     G. W. BYRAM ET AL     3,515,911

SURFACE WAVE TRANSDUCER

Filed Oct. 28, 1968     3 Sheets-Sheet 1

INVENTORS.
GEORGE W. BYRAM
HARPER J. WHITEHOUSE
BY ERVIN F. JOHNSTON
ATTORNEY.
JOHN STAN
AGENT.

United States Patent Office 3,515,911
Patented June 2, 1970

3,515,911
SURFACE WAVE TRANSDUCER
George W. Byram, Pasadena, and Harper John Whitehouse, Hacienda Heights, Calif., assignors to the United States of America as represented by the Secretary of the Navy
Filed Oct. 28, 1968, Ser. No. 771,373
Int. Cl. H01v 7/00
U.S. Cl. 310—8.1                                  9 Claims

ABSTRACT OF THE DISCLOSURE

A transducer for launching a surface wave signal along the surface of a solid substrate which need not be piezoelectric. The transducer includes a stack comprising transducer elements separated by spacing elements, or spacers, and surface driving feet attached to the lowermost transducer element and placed upon the surface of a substrate upon which the acoustic surface wave is to be launched. Generally, both the vertical spacing of the transducer elements and the horizontal spacing of the driving feet are a function of the specific code sequence corresponding to the desired transducer transfer function.

---

The invention described herein may be manufactured and used by or for the Government of the United States of America for governmental purposes without the payment of any royalties thereon or therefor.

In the field of surface wave transducers for use on non-piezoelectric substrates, it has been the general practice to employ either wedge coupling block transducers or Sokolinskii, or comb-type, transducers. Although such devices have served the purpose, they have not proved entirely satisfactory under all conditions of service. Considerable difficulty has been experienced in that the comb-type transducer has low efficiency, and the wedge-type transducer requires unusual material properties.

In the wedge coupling block transducers, a longitudinal or shear wave generated by a piezoelectric transducer is totally internally reflected in the wedge. This sets up boundary conditions at a wedge-substrate interface which result in the propagation of a surface wave. Constraints on wedge angle, wedge material density and acoustic propagation velocity make choice of a suitable material difficult. It is not easy to generate a strong surface wave at high frequencies because of excessive heating produced in the relatively thin piezoelectric transducer element.

Unusual material properties are required in the wedge-type transducer, in that the material for the wedge itself must be of a type whose longitudinal sound velocity, typically one of the faster sound wave velocities, is slower than the surface wave sound velocity of the substrate on which it is desired to generate the surface wave. This makes it necessary to find a material for the wedge whose fast velocity is slower than the slowest velocity of the substrate. In addition, if it is desired to obtain a good match between the wedge material and the transducer that drives it, it is required that there be a $\rho c$ match, where $\rho$ is the density of the wedge material and $c$ is the velocity of propagation in the wedge material. Since the propagation velocity in the wedge material is usually slow, a very high $\rho$ is required to keep the $\rho c$ product the same. The above constraints apply when a longitudinal wave is generated in the transducer.

Reflections are a major cause of the problem in having a good match between the wedge and the transducer, but the critical part of the problem is the requirement that the projection of the longitudinal wave in the wedge, on the bottom surface of the wedge, and hence on the substrate, agree cycle for cycle with the wave of the same frequency propagating on the surface. This cycle for cycle match is essential for proper coupling of the energy from the wave in the wedge to the surface wave. If the wedge transducer is to be used with a shear wave, the problem of which material to use for the wedge is a bit simple, because the velocity mismatch between a surface wave and a shear wave is not as great as that between a longitudinal wave and a surface wave.

The design of modern transducers involves a compromise among these defects in the wedge-type transducer, because usually every condition cannot be satisfied. Since the wave-for-wave match in the wedge and substrate is essential, it may therefore be necessary to sacrifice a good $\rho c$ match between the transducer and the wedge, or if a shear wave is used in the wedge to obtain a smaller mismatch of velocity, then the difficulties of efficiently coupling a shear wave from a transducer into the wedge must be accepted. It is difficult to couple a shear wave across an interface between two materials.

In the Sokolinskii comb, the comb-shaped structure is put against the substrate on which it is desired to generate the acoustic surface wave. A conventional longitudinal wave transducer is then placed on top of this comb structure and allows a longitudinal wave to be generated downward into the comb structure. However, this longitudinal wave interacts with the surface on which it is desired to propagate a surface wave only at those points at which the surface of the substrate touches the teeth of the comb. The spacing of the teeth and the frequency of operation are so chosen that an agreement is forced between them in such a way that, if a surface wave starts at one end of the comb transducer by a tooth pushing down, it will have travelled the proper distance to be in exactly the right phase to be pushed down again by another tooth so that it will add to the energy from the previous push downwards. This match is essential, otherwise the waves will cancel, giving the transducer a very low bandwidth. At a given frequency, this match occurs only for one specific tooth spacing. Hence, when the spacing between the teeth of the comb is once chosen, there is a constraint upon the region of frequency of operation of the transducer. In effect, the comb structure acts as a special filter which discriminates against waves with a spacial period different from the period determined by the spacing between the feet of the comb.

The general purpose of this invention is to provide a surface wave transducer which embraces all the advantages of similarly employed surface transducers in the prior art which were used on non-piezoelectric substrates and possesses none of the aforedescribed disadvantages. To attain this, the present invention contemplates a unique arrangement or stacking of transducer elements and spacing elements, with the bottom transducer element mounted upon surface driving feet. The transducer elements and spacing elements are arranged in an alternating sequence, with the stacked array being terminated on the bottom by a transducer element and on the top, generally, by an absorbing material. Attached to the bottom transducer, in the usual configuration, is a linear array of feet which are spaced in a manner which is related to the spacing of the transducer elements and spacing elements.

In effect, the transducer elements and the surface driving feet are both distributed in coded sequences. The sequences and spacing are so chosen that, taking into account the velocity of propagation of the exciting wave in the transducer stack and the velocity of the desired surface wave under the driving feet, an impulsive excitation of the transducer elements results in a propagating surface wave which is highly localized in the direction of propagation. Such a transducer has an impulse response which is concentrated in time; hence, it has high bandwidth. By proper choice of code sequences the design of the transducer has a high degree of flexibility in that the response may be tailored to meet specific requirements.

One of the key differences between the invention herein disclosed and the comb-type transducer of the prior art, is that in this invention the spacing of the feet is so coded as to interact with a specific driving sequence of impulses to preserve a broad bandwidth through the device. The pattern of the elements in the transducer stack form one code and the pattern of the feet form another code. It is the choice of the relation between these two patterns which controls the impulse response of the device, although the surface wave transducer of this invention is useful even when only the spacing of the feet corresponds to a coded sequence.

While superficially it may appear that the surface wave transducer of this invention is subject to the same constraints with regard to the spacing of the feet as pertained to the spacing of the teeth of the Sokolinskii transducer, this is not true for the following reasons. In the invention herein disclosed, the spacing of the feet of the transducer corresponds to a coded pattern, hence there is a coded driving wave. The codes are chosen in such a way that a sequence of impulses applied simultaneously to the transducer stack results in a pattern of longitudinal waves propagating down the stack that interacts with the coded pattern of feet in such a way that at some point on the wave as it moves along, all of these waves are additive. Best results are obtained when the net electrical input to surface wave output transfer function approximates a delta function. A device having a transfer function in time which approximates a delta function has a wide frequency response.

Accordingly, one object of the present invention is the provision of a surface wave transducer whose bandwidth greatly exceeds that available from similar transducers in the prior art.

Another object is to provide a surface wave transducer having no severe constraints on properties of the material of the transducer.

A further object of the invention is the provision of a surface wave transducer capable of handling a higher input power than is possible by presently available transducers in the same frequency range.

Still another object is to provide a surface wave transducer wherein the designer can exert control over the response by his choice of code sequences.

Other objects and many of the attendant advantages of this invention will be readily appreciated as the same becomes better understood by reference to the following description when considered in connection with the accompanying drawings, wherein.

Figure 1:
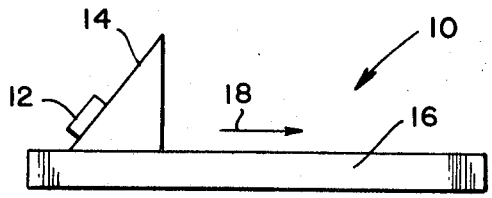
FIG. 1 is a diagrammatic view of a wedge-type surface wave transducer used in the prior art.

Referring now to the drawings, there is shown in FIG. 1 a wedge-type surface wave transducer 10, consisting of a transducer element 12 mounted upon a coupling wedge 14, which in turn is mounted upon the substrate 16. The direction of the surface wave generated is shown by arrow 18.

Figure 2:
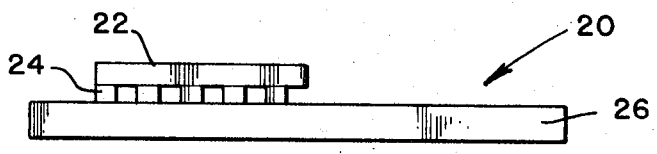
FIG. 2 is a diagrammatic view of a Sokolinskii or comb-type transducer used in the prior art.

FIG. 2 shows another type of prior art surface wave transducer, the Sokolinskii or comb-type transducer 20. A transducer element 22 has teeth 24, arranged in a periodic comb structure, attached to its lower surface. The teeth 24 are in turn mounted upon a substrate 26.

Figure 3:
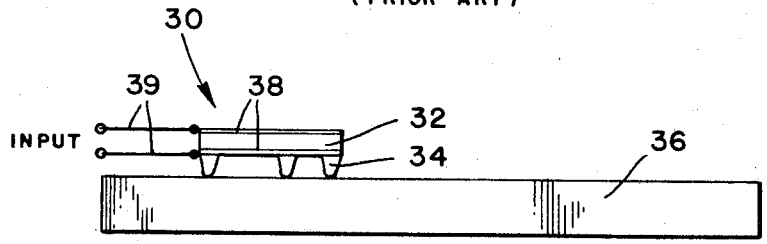
FIG. 3 shows a diagrammatic view of a very simple embodiment of surface wave transducer of this invention.

FIG. 3 shows a very simple embodiment of this invention. Therein is shown a surface wave transducer 30 comprising a transducer element 32 sandwiched between two electrodes 38. The material of the transducer element is piezoelectric usually, but any material which gives a mechanical output in response to an electrical input can be used. Attached to the bottom electrode 38 are the surface driving feet 34, which are spaced in accordance with a coded sequence and which push against a substrate 36.

The surface driving feet 34 may be made of a piezoelectric material in which the velocity of propagation is approximately that of the transducer element 32. The material of the surface driving feet 34 must also be mechanically strong enough to transmit acoustic energy to the top surface of the substrate 36.

The only basic restriction upon the type of material that may be used for the substrate 36 is that it be capable of supporing and transmitting a surface wave along its surface. The material of the substrate need not be piezoelectric, but of course piezoelectric material may be used.

Figure 4:
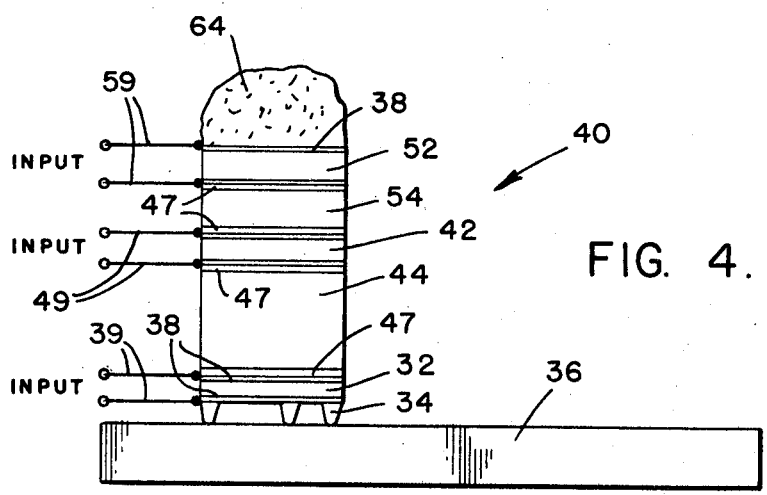
FIG. 4 shows a more complex embodiment of the surface wave transducer of this invention.

In general, the width of the surface driving feet 34 is considerably greater than the height of the feet. In FIG. 4, the width would be considered in a direction perpendicular to the plane of the page. This relationship is necessary in a transducer 30 of this type, because it is desired that the beam of traveling surface waves be a number of wavelengths wide to prevent diffraction spreading from the transducer. When straight-line propagation is required, a preferable arrangement of the surface driving feet 34 is that they be arranged in a linear array in the direction of wave propagation. It is desirable that the surface driving feet 34 be rounded at the bottom to eliminate averaging of the signal and the consequent cancellation.

Usually the surface driving feet 34 would be connected directly to the electrode 38 which is attached to the bottom surface of the transducer element 32. If a spacer were provided between the bottom electrode 38 and the surface driving feet 34, this would means that there would be an additional time delay in the generative acoustic surface wave. Every bit in the sequence would be delayed uniformly, and so it would not affect operation, other than by the delay. An input signal for driving the transducer element 32 is fed by means of leads 39 connected to the electrodes 38.

FIG. 4 shows a more complex, refined, embodiment of this invention. That part of this figure which is below the top electrode 38 attached to the bottom transducer element 32 is identical to the surface wave transducer 30 as shown in FIG. 3. However, the structure of surface wave transducer 40 includes components which are above this top electrode 38 and thus provides another embodiment. Surface wave transducer 40 includes three transducer elements, 32, 42 and 52. It is to be understood that in an actual embodiment many more than three transducer elements would probably be used.

It is not essential that the transducer elements 32, 42 and 52 be restricted to the same thickness, although in the great majority of cases this would be done. Slight variations in the transducer element thickness provide another independent variable in tailoring the shape of the response. This amounts to rounding off the corners in the impulse response. If it is desired to have a transducer with a higher bandwidth, for example, one whose response has a high central peak or spike, the thickness of the transducer elements could be varied.

Positioned in between the transducer elements 32 and 42 is a spacing element or spacer 44. Similarly, situated between transducer elements 42 and 52 is a spacer 54. The material of the spacing elements 44 and 54 need not be piezoelectric, however, it should be of a material which has a low loss at acoustic frequencies. If the spacers 44 and 54 be made of the same material, their thicknesses would be a whole number multiple of some basic thickness for this example.

Inasmuch as the spacers 44 and 54 may be made of the same material as the transducer elements 32, 42 and 52, insulating sheets 47 situated between a transducer element and a spacer are provided to insure that only the transducer elements 32, 42 and 52 are driven by an input signal through leads 39, 49 or 59. No insulating sheet 47 is required below the bottom electrode 38 attached to the bottom transducer element 32 or above the top electrode 38 attached to the top transducer element 52.

The insulating sheets 47 can be extremely thin, even vacuum-deposited. Where aluminum electrodes 38 are used, the insulating sheet 47 could be the coating of the aluminum oxide formed on the surface of the electrode. A thin layer of silicon monoxide may also be used as an insulating sheet 47. The thickness of the insulating sheet 47 may be as little as a fraction of a thousandth of an inch. Still with reference to FIG. 4, the insulating sheets 47 separating the active transducer elements 32, 42 and 52 from the passive spacing elements, or spacers 44 and 54, are not required if the spacers are not also piezoelectric material.

Inasmuch as it is desired that the acoustic wave traverse the surface wave transducer 40 in a downward direction only, an absorbing material, or absorber 64, is placed on the top electrode 38 to prevent the acoustic wave propagation in an upward direction from being reflected downward from the top of the stack. An optimum material for use as the absorbing material 64 would be one whose acoustic impedance is the same as that of the transducer elements 32, 42 and 52, but which was also very lossy for acoustic wave propagation. Some composite materials having small particles embedded in another have been found very useful. The energy of the acoustic wave is absorbed and changed into frictional heat.

In other embodiments where it may be desired to utilize reflected acoustic waves traversing the surface wave transducer in an upward direction, the absorber 64 is not used.

Still referring to FIG. 4, it will be observed that all of the input leads, or connections, 39, 49 and 59 are shown connected independently to respective transducer elements 32, 42 and 52. In the usual embodiment, input leads 39, 49 and 59 are connected in parallel or series. In a transducer stack consisting of alternate transducer elements and spacers, the proper time delay is provided by the width of the spacers 44 and 54 and the input signals may be applied simultaneously to all three transducer elements 32, 42 and 52 in series or parallel.

Connection of the input leads 39, 49 and 59 in parallel results in the transducer 40 having a low input impedance, whereas providing a serial input connection results in a relatively high-impedance transducer 40. Since the usual piezoelectric material has an unavoidable high dielectric constant, this tends to create a capacitive loading and therefore it is usually more convenient to drive the transducer elements 32, 42 and 52 in series.

Figure 5:
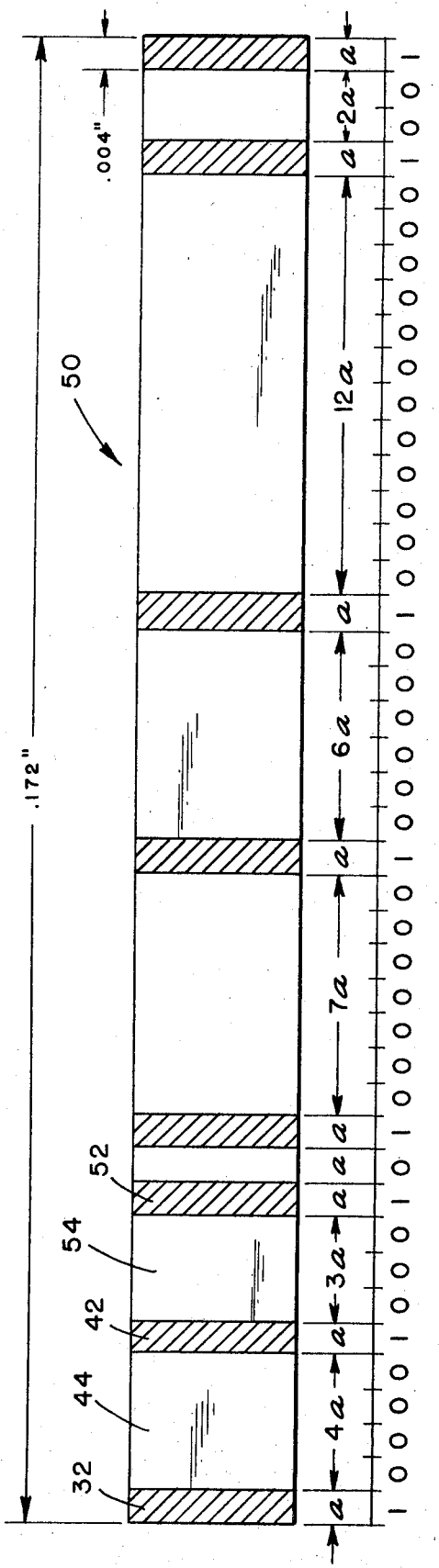
FIG. 5 is a diagrammatic view showing the arrangement of the transducer elements and spacing elements for the particular code sequence used as an example in the specification.

FIG. 5 shows what may be called a transducer stack 50, consisting of alternate transducer elements 32, 42 and 52, and spacers 44 and 54. Other transducer elements shown by cross-hatched lines are not numbered and other spacers, not cross-hatched, are also shown. A transducer element thickness of 0.004" is taken as a basic thickness and is designated as "a." The thicknesses of the alternate layers of transducer elements and spacers is shown in multiples of the unit thickness "a." The coding which the alternations of transducer elements and spacers designate are shown below the thickness designations. Assuming that the spacers are of a material which has the same velocity of propagation as the active transducer elements, the thickness of the spacers will be that multiple of 0.004" corresponding to the number of 0's between the 1's in the coded sequence shown at the bottom of this figure.

In a typical embodiment, the transducer stack 50 may consist of Y-cut lithium niobate ($LiNbO_3$) and be used for generating a compression wave having a frequency of approximately 32 megaHertz.

In FIG. 5, neither the electrodes nor the insulating sheets are shown, inasmuch as they have a negligible thickness.

Figure 6:
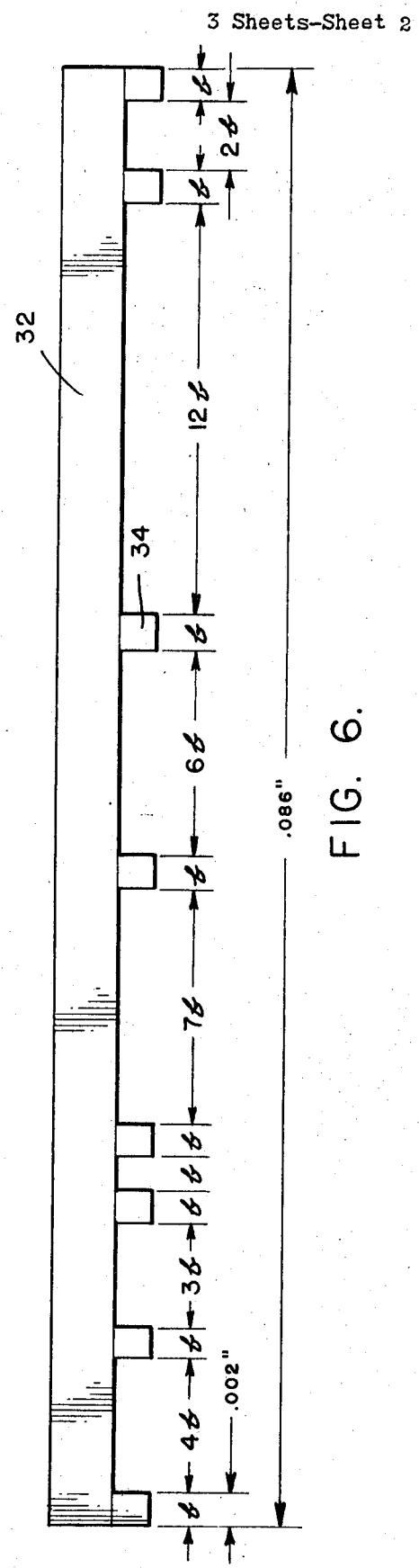
FIG. 6 is a diagrammatic view of the bottom transducer element with the attached driving feet spaced according to the same code as the transducer and spacing elements of FIG. 5.

FIG. 6 shows a foot sequence and spacing for an 8-bit staggered sequence on a fused quartz substrate, also for operation at approximately 32 megaHertz. The unit thickness for the surface driving feet 34 is 0.002" and designated as "b," while the spacing between the feet is some whole number multiple of b. It will be observevd that the coding sequence in this figure for the driving feet 34 is identical to the coding sequence for the transducer stack 50 as shown in FIG. 5.

In FIG. 5, the transducer spacing was chosen to correspond to multiples of one-half wavelength of a 32-megaHertz acoustic wave traveling in lithium niobate used as the transducer material. In FIG. 6 the spacing of the feet 34 corresponds to multiples of one-half wavelength of the same 32 megaHertz wave. If it is desired to operate at a different frequency, all thicknesses of the transducer stack 50 would be scaled and the spacing of the feet 34 would be scaled proportionately, also.

If a material for the spacer 44 or 54 has a different velocity of propagation than the active transducer elements 32, 42 and 52, then, for the spacers, the basic thickness 0.004" need only be scaled by the ratio of the velocity of propagation in the spacers to the velocity of propagation in the active transducer elements. This would preserve the same time delay.

If the sequence of active transducer elements and spacing elements in FIG. 5 be reversed in a vertical direction, with no corresponding reversal of the sequence of feet, this would result in a reversal of the direction of propagation of the surface wave across the top surface of the substrate 36.

Also, reversing the order of the feet from left to right, only changes the direction in which the high bandwidth surface wave travels.

With respect to the sequences actually shown in the figures, the pattern of active elements in the transducer stack 50 and the pattern of feet 34 are chosen to be identical. This is not an essential condition but it is useful in a great many practical cases.

FIG. 5 shows a transducer stack 50 consisting of alternate transducer and spacing elements, and FIG. 6 shows spacing for a foot sequence, both corresponding to an 8-bit staggered sequence. This sequence can be thought of as a coded sequence of 1's and 0's in FIG. 5 the 1's corresponding to the varying thickness of spacer elements.

In FIG. 6 the position of the feet correspond to a 1, while the spacing between the feet is proportional to the number of 0's in an adjacent group separated by 1's.

FIG. 7 shows the impulse response at (A) based on the coded sequence shown at (B), which coded sequence is the same as that shown for the spacing of the transducer and spacing elements of the transducer stack 50 in FIG. 5 and the array of driving feet 34 shown in FIG. 6. It will be noted that the sequence on every line is the same, only being displaced horizontally. The impulse response is the result that is gotten by convolving the code with itself.

Figure 7A:
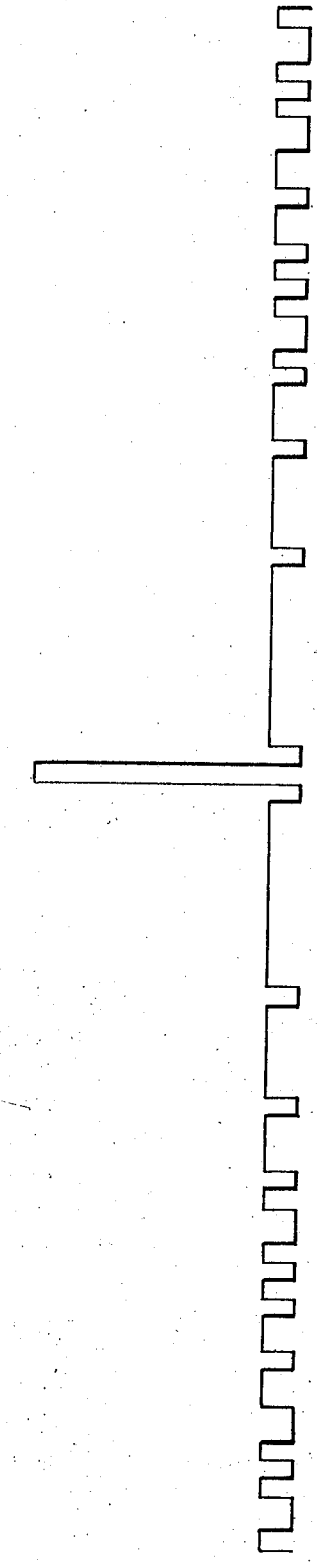
FIG. 7 shows, in part (A), the impulse response of the surface wave transducer, and, in part (B), a partial "Addition Table" showing how the impulse response is obtained.
Figure 7B:
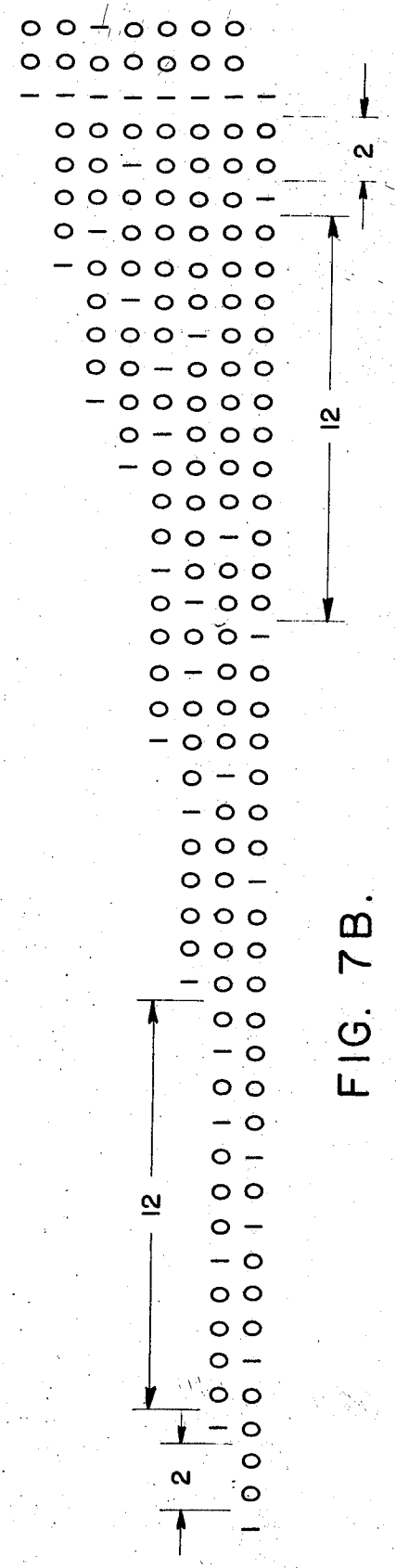

Discussing the process of shifting and convolving of the sequence in more detail, the sequence shown on the bottom line of FIG. 7(B) is shifted successively and one bit at a time to the right. After being shifted one bit to the right, the sequence is multiplied by its second bit and then the original sequence is shifted two bits to the right of the original sequence, and multiplied by its third bit, etc. It will be seen that as a result of this process only one of the columns has a multiplicity of 1's, whereas other columns, but not all, will have only one 1 somewhere in the column. The net result of all the shifts, multiplications and additions is a convolution.

Inasmuch as the coded sequence consists primarily of 0's, most shifts and multiplications result in rows of all 0's. In what may be called an "Addition Table," as shown in FIG. 7(B), these particular shifts and convolutions are not shown, otherwise the Addition Table would contain many more rows. In effect, only the significant shifts are shown in the Addition Table of FIG. 7(B). The significant shift distances are related to the number of 0's between successive 1's. Shifts corresponding to two 0's and twelve 0's are shown.

The compressed table or pattern, if complete, is generally trapezoidal in shape and only in one place in a compressed table will there be a full column of 1's for this particular code. The Addition Table shown in FIG. 7(B) does not seem trapezoidal because it is truncated at the right-hand side due to space limitations. Enough of the table is shown to make obvious the part of it that is lacking.

The column of 1's corresponds to the high central peak shown in FIG. 7(A). In all other columns, there is present either one 1 or none, the lack of any 1's corresponding to the notches shown extending downward at the wings of the top FIG. 7(A). Those columns of the Addition Table where there are 1's present, with, in most cases, a number of 1's adjacent to each other correspond to the flat peaks having a height of one unit, whereas the amplitude of the central peak, 8 units, corresponds to the total number of 1's in the coded sequence.

The successive shifting and adding of the bit sequences is done because the shifting represents or corresponds to a time delay for a wave coming from a higher position in the transducer stack. Then the bit sequences are added, because the sequence is so chosen that at some point in time all of the bit sequences add up. In this manner, the central spike, or pulse, is obtained. The arrangement of 1's and 0's in the sequence is so chosen as to prevent the 1's from adding up at more than one spot. This ensures that a high bandwith is obtained from the surface wave transducer.

In the design of a coded sequence such as is herein described, a desirable design characteristic for the sequence is to have "low numbers" in the sequence. These "low numbers" correspond to small numbers of 0's between the 1's. It will be observed that the sequence contains one 0 between two 1's two 0's between two 1's, etc. In the particular sequence used, however, there is also a long sequence of twelve 0's between two 1's. The presence of the "low numbers" in the sequence ensures that the total length is small, in general. Another desirable feature of the coded sequence is that it begins and ends with a 1, since 0's at the end would merely be equivalent to an extra delay.

Although there are algorithms for choosing a sequence of this type, quite often a suitable sequence may be determined more easily simply by trial and error.

Many codes may be used with the surface wave transducer of this invention. The particular code sequence shown in FIG. 7(B) is known in the mathematical literature as a "sub-optimum stagger sequence." This particular type of sequence is useful in radar and ranging theory and also where codes with a specific impulse property must be used. An "optimum code" as related to FIG. 7(A) would have all 1's at both wings of the peak impulse with no downward serrations. There are, in all, only a very few optimum codes, all others being termed "sub-optimum."

Many other constructions utilizing the concept of a related pair of code sequences are possible. The simplest case would probably consist of a single transducer element 32 matched to a coded set of surface driving feet 34 and driven by a coded sequence of pulses. The use of a tapped delay line to generate a sequence of pulses would then preserve the impulse form of the input-output relationship. Stated differently, a single transducer element can be matched to a pattern of driving feet, by driving the single transducer by a preprocessed signal which has traversed a tapped delay line and simulates the delay structure of a transducer stack having spacing elements of appropriate thicknesses.

In still another alternative embodiment, a single driving transducer may be used as in the Sokolinskii comb, and driven with a driving sequence generated by a separate delay line. This would be equivalent to use of the separate delay line to generate an impulse function input to pattern output to drive a single transducer to approximate the operation of the stacked transducer used in this invention. One disadvantage of this alternative arrangement is that it does not permit an increase in the amount of active material in the transducer. The delay line appears between the input signal source and the driving transducer. In other words, the single transducer would be driven by the sum of the outputs from various taps along the delay line. In some instances, it may be necessary to use isolation between the various taps on the delay line to prevent the signals from interacting with each other. In general, the signals from the delay line are first fed into a summing amplifier and the summing amplifier is used to drive the transducer.

If it is desired to merely create an impulsive disturbance propagating as a surface wave, a delay line is not necessary, the series of impulses being applied directly to the driving transducer. This might be a useful procedure for testing some materials for their acoustic wave properties, where it is desired to generate a strong surface wave. However, where it is desired to use a surface wave with a carrier for some other signal, typically that other signal would be modulated onto the surface wave, and so a net input-to-output transfer function is needed that can take an arbitrary signal and run it out as a surface wave while preserving high bandwidth. The delay line structure then serves as an intermediate processor, or processing step, between the new transducer and the input signal.

In another alternate embodiment, if the chosen sequence is symmetric about its center, one half of the number of transducer elements and one half of the number of spacers as well as the absorbing material 64 may be eliminated and the reflection from the top of the transducer stack used to provide the second half of the sequence.

It will be readily apparent that, in an alternative embodiment, the stacked array of transducer elements and spacers may be dimensioned so as to correspond to a predetermined code, whereas the spacing of the driving feet may be uniform, that is, uncoded. This arrangement would have the advantage over the comb-type transducer in the large volume of the transducer stack permitting it to handle more power.

For a given transducer driver stack, there could be an arrangement of two or more different arrays of surface driving feet 34 to produce special results. For example, if the second arrangement of driving feet 34 were arranged in exactly the opposite sequence from the first array, then surface waves could be generated on a substrate 36 which traveled in two opposite directions.

Another useful arrangement of the surface driving feet 34 would involve having a second arrangement of surface driving feet which has a sequence slightly different from the first arrangement. Thus, the bandwidth of the surface wave transducer could be increased, or, if desirable, it could be reduced somewhat.

Obviously many modifications and variations of the present invention, in addition to those described in detail, are possible in the light of the above teachings. It is therefore to be understood that in the scope of the appended claims the invention may be practiced otherwise than as specifically described.

What is claimed is:

1. A surface wave transducer comprising:
   a first transducer element comprising a material for converting electrical energy into acoustical energy, the transducer element having two parallel surfaces;
   a first pair of electrodes attached to the parallel surfaces;
   a pair of leads connected to the electrodes; and
   a set of at least three surface driving feet attached to a first one of the electrodes, the spacing between the driving feet being nonuniform and corresponding to a predetermined coded sequence.

2. A transducer according to claim 1, further comprising:
   a spacing element capable of transmitting acoustic energy attached to the other electrode;
   a second transducer element sandwiched between a second pair of electrodes,
   one of the electrodes of the second pair being attached to the spacing element; and
   a pair of leads connected to the second pair of electrodes.

3. A transducer according to claim 2, further comprising:
   a material capable of absorbing acoustic energy attached to the other electrode of the second pair of electrodes.

4. A transducer according to claim 3, further comprising:
   a pair of insulating sheets positioned between the spacing element and the two electrodes adjacent to the spacing element.

5. A transducer according to claim 4, further comprising:
   a stack consisting of an insulating sheet, a spacing element, an insulating sheet, an electrode, a transducer element, and an electrode,
   the stack being positioned between the absorbing material and its adjacent electrode, with the insulating sheet being positioned against one of the electrodes of the second pair of electrodes,
   each electrode of the stack being connected to an input lead.

6. A transducer according to claim 5 wherein the relative thicknesses and spacing of the transducer and spacing elements correspond to a coded sequence.

7. A transducer according to claim 6 wherein the coded sequence corresponding to the spacing of the feet is the same coded sequence as that corresponding to the thicknesses and spacing of the transducer and spacing elements.

8. A transducer according to claim 7 wherein the other coded sequence is the reverse of the predetermined coded sequence for the spacing of the driving feet.

9. A transducer according to claim 5, further comprising:
   a substrate located under the surface driving feet.

References Cited
UNITED STATES PATENTS

| | | | |
|---|---|---|---|
| 2,921,134 | 1/1960 | Greenspan et al. | 310—8.1 X |
| 3,004,424 | 10/1961 | Henry | 310—8.1 X |
| 3,243,648 | 3/1966 | Yando | 310—8.1 X |
| 3,246,164 | 4/1966 | Richmond | 310—8.1 X |
| 3,353,120 | 11/1967 | Tournois | 333—30 |
| 3,360,749 | 12/1967 | Sittig | 310—8.0 X |
| 3,399,314 | 8/1968 | Phillips | 310—8.6 X |
| 3,412,269 | 11/1968 | Crittenden | 310—8.1 |
| 3,453,456 | 7/1969 | Oltman | 310—8.6 X |

WARREN E. RAY, Primary Examiner

M. O. BUDD, Assistant Examiner

U.S. Cl. X.R.

73—67.8; 310—8.3, 9.8; 333—30